United States Patent
Nagai

(10) Patent No.: US 8,570,573 B2
(45) Date of Patent: Oct. 29, 2013

(54) IMAGE PROCESSING SYSTEM, IMAGE PROCESSING APPARATUS, AND INFORMATION PROCESSING APPARATUS

(75) Inventor: Kohta Nagai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 261 days.

(21) Appl. No.: 13/159,541

(22) Filed: Jun. 14, 2011

(65) Prior Publication Data
US 2011/0317224 A1 Dec. 29, 2011

(30) Foreign Application Priority Data
Jun. 24, 2010 (JP) ................................. 2010-143559

(51) Int. Cl.
*G06F 3/12* (2006.01)

(52) U.S. Cl.
USPC ........... 358/1.15; 358/1.9; 358/1.13; 358/448

(58) Field of Classification Search
None
See application file for complete search history.

(56) References Cited

U.S. PATENT DOCUMENTS

| | | | |
|---|---|---|---|
| 6,990,663 B1 | 1/2006 | Arndt | |
| 7,464,405 B2 * | 12/2008 | Dawkins et al. | 726/17 |
| 7,688,466 B2 * | 3/2010 | Manchester | 358/1.15 |
| 7,894,449 B2 * | 2/2011 | Mohanty | 370/395.3 |
| 8,392,497 B2 * | 3/2013 | Vilke et al. | 709/202 |
| 2005/0024666 A1 * | 2/2005 | Ohyama et al. | 358/1.13 |
| 2008/0077919 A1 | 3/2008 | Shida et al. | |
| 2009/0049453 A1 * | 2/2009 | Baran et al. | 719/313 |
| 2009/0190165 A1 * | 7/2009 | Yoshida | 358/1.15 |
| 2011/0050712 A1 * | 3/2011 | Jackson | 345/503 |
| 2011/0078488 A1 * | 3/2011 | Hegde et al. | 714/3 |

FOREIGN PATENT DOCUMENTS

| | | | |
|---|---|---|---|
| JP | 2002-041306 | 2/2002 | |
| JP | 2008-077186 | 4/2008 | |
| JP | 2009-181345 | 8/2009 | |
| JP | 2009-201092 | 9/2009 | |
| JP | 2010074432 A * | 4/2010 | H04N 1/00 |

\* cited by examiner

*Primary Examiner* — Dung Tran
(74) *Attorney, Agent, or Firm* — IPUSA, PLLC

(57) ABSTRACT

An image processing system includes an image processing apparatus and an information processing apparatus that are connected via a data communication channel. The image processing apparatus includes an execution request unit sending an execution request to request the information processing apparatus to execute an image processing function, a command reception unit receiving a control command from the information processing apparatus, and a hardware control unit controlling a hardware component of the image processing apparatus based on the received control command to perform image processing corresponding to the image processing function. The information processing apparatus includes a request reception unit receiving the execution request from the image processing apparatus, a software control unit executing a software program for implementing the image processing function based on the received execution request, and a command transmission unit sending the control command generated by the software program to the image processing apparatus.

10 Claims, 11 Drawing Sheets

IMAGE PROCESSING SYSTEM, IMAGE PROCESSING APPARATUS, AND INFORMATION PROCESSING APPARATUS

CROSS-REFERENCE TO RELATED APPLICATION

The present application is based upon and claims the benefit of priority of Japanese Patent Application No. 2010-143559, filed on Jun. 24, 2010, the entire contents of which are incorporated herein by reference.

BACKGROUND OF THE INVENTION

1. Field of the Invention

A certain aspect of this disclosure relates to an image processing system, an image processing apparatus, and an information processing apparatus.

2. Description of the Related Art

Japanese Laid-Open Patent Publication No. 2008-77186 (JP2008-77186), for example, discloses a technology for setting up a virtual machine (VM) environment on an image processing apparatus to enable software programs running on multiple virtual machines (VM) to share hardware resources of the image processing apparatus.

In recent multifunction image processing apparatuses, various functions (or services) are implemented by software programs and a new function (extended function) can be created by combining the software programs.

Such image processing apparatuses preferably include high-performance hardware components to improve the performance of the functions. However, using expensive hardware components increases the product cost.

For this reason, it is desired to efficiently use limited hardware resources and thereby to achieve both low production cost and high performance.

However, with the related-art technology that tries to achieve both low production cost and high performance by optimizing the configuration of an image processing apparatus alone, it is difficult to achieve this goal when more and more functions are added to the image processing apparatus.

SUMMARY OF THE INVENTION

In an aspect of this disclosure, there is provided an image processing system including an image processing apparatus and an information processing apparatus that are connected via a data communication channel. The image processing apparatus includes an execution request unit configured to send an execution request to request the information processing apparatus to execute a requested image processing function, a command reception unit configured to receive a control command from the information processing apparatus, and a hardware control unit configured to control a hardware component of the image processing apparatus based on the received control command to perform requested image processing corresponding to the requested image processing function. The information processing apparatus includes a request reception unit configured to receive the execution request from the image processing apparatus, a software control unit configured to execute a software program for implementing the requested image processing function based on the received execution request, and a command transmission unit configured to send the control command generated by the executed software program to the image processing apparatus.

DESCRIPTION OF THE PREFERRED EMBODIMENTS

Preferred embodiments of the present invention are described below with reference to the accompanying drawings.

First Embodiment

<System Configuration>

Figure 1:
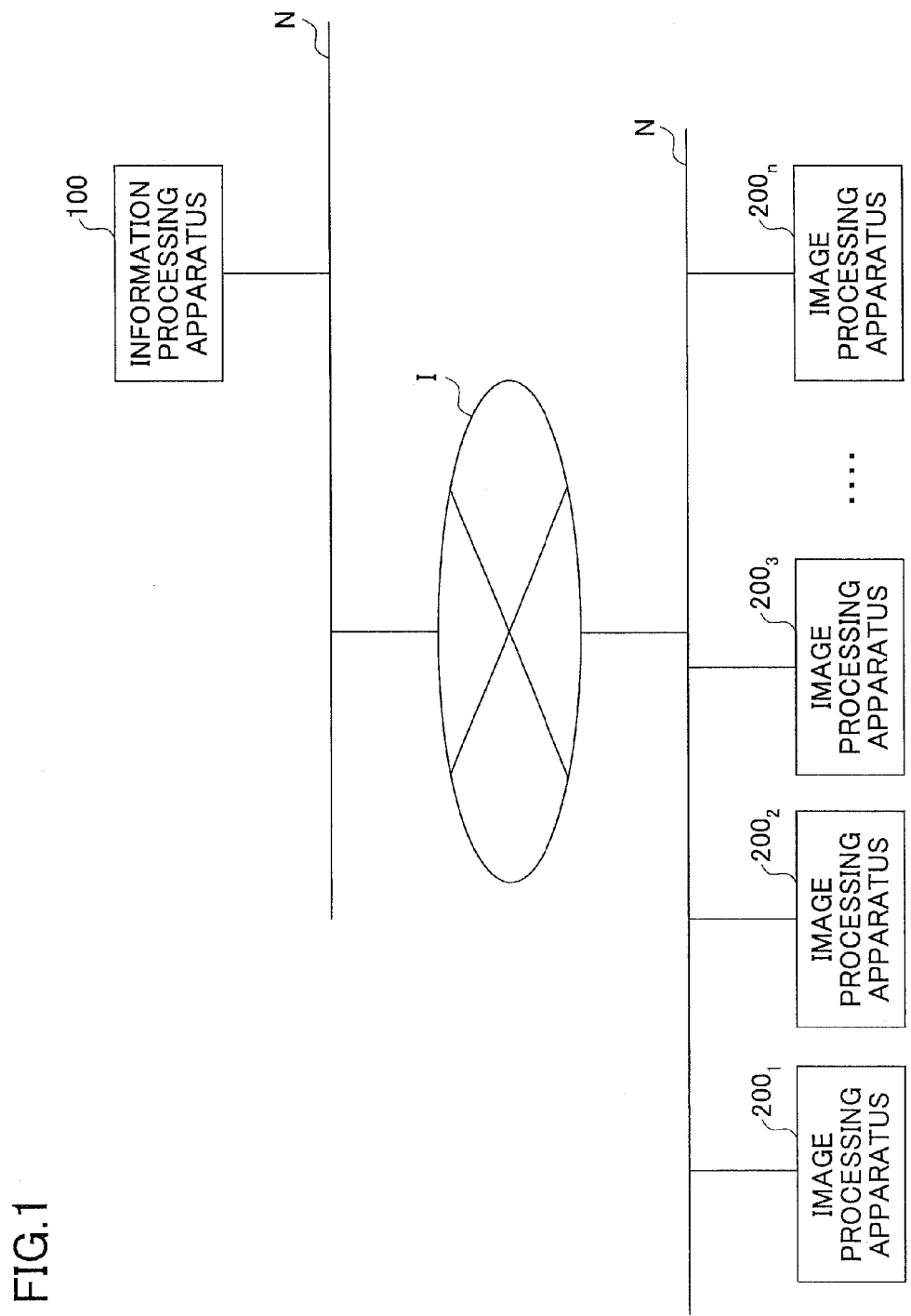
FIG. 1 is a drawing illustrating an exemplary configuration of an image processing system according to a first embodiment.

FIG. 1 is a drawing illustrating an exemplary configuration of an image processing system 1 according to a first embodiment.

As illustrated in FIG. 1, the image processing system 1 includes one or more image processing apparatuses $200_1$ through $200_n$ (hereafter, may be called an image processing apparatus 200 or image processing apparatuses 200) connected to an internal data communication channel N such as a local area network (LAN). The image processing apparatus 200 may be, for example, a multifunction peripheral (MFP) or a printer that includes hardware components for implementing image processing functions. The image processing system 1 also includes an information processing apparatus 100 connected to an internal data communication channel N. The internal data communication channel N connected to the image processing apparatus 200 is connected via an external data communication channel I such as the Internet to the internal data communication channel N connected to the information processing apparatus 100. The information processing apparatus 100 may be, for example, a personal computer (PC) that includes software components for implementing image processing functions.

In the image processing system 1 of this embodiment, the information processing apparatus 100 and the image processing apparatus 200 perform data communications via the internal data communication channels N and the external data communication channel I.

With the image processing system 1 configured as described above, it is possible to provide image processing functions (or services) through collaboration between apparatuses (i.e., the information processing apparatus 100 and the image processing apparatus 200) having communication units.

Here, the internal data communication channels N are preferably connected via firewalls to the external data communication channel I to improve the security.

<Hardware Configurations>

Hardware configurations of the information processing apparatus 100 and the image processing apparatus 200 of this embodiment are described below.

<Information Processing Apparatus>

Figure 2:
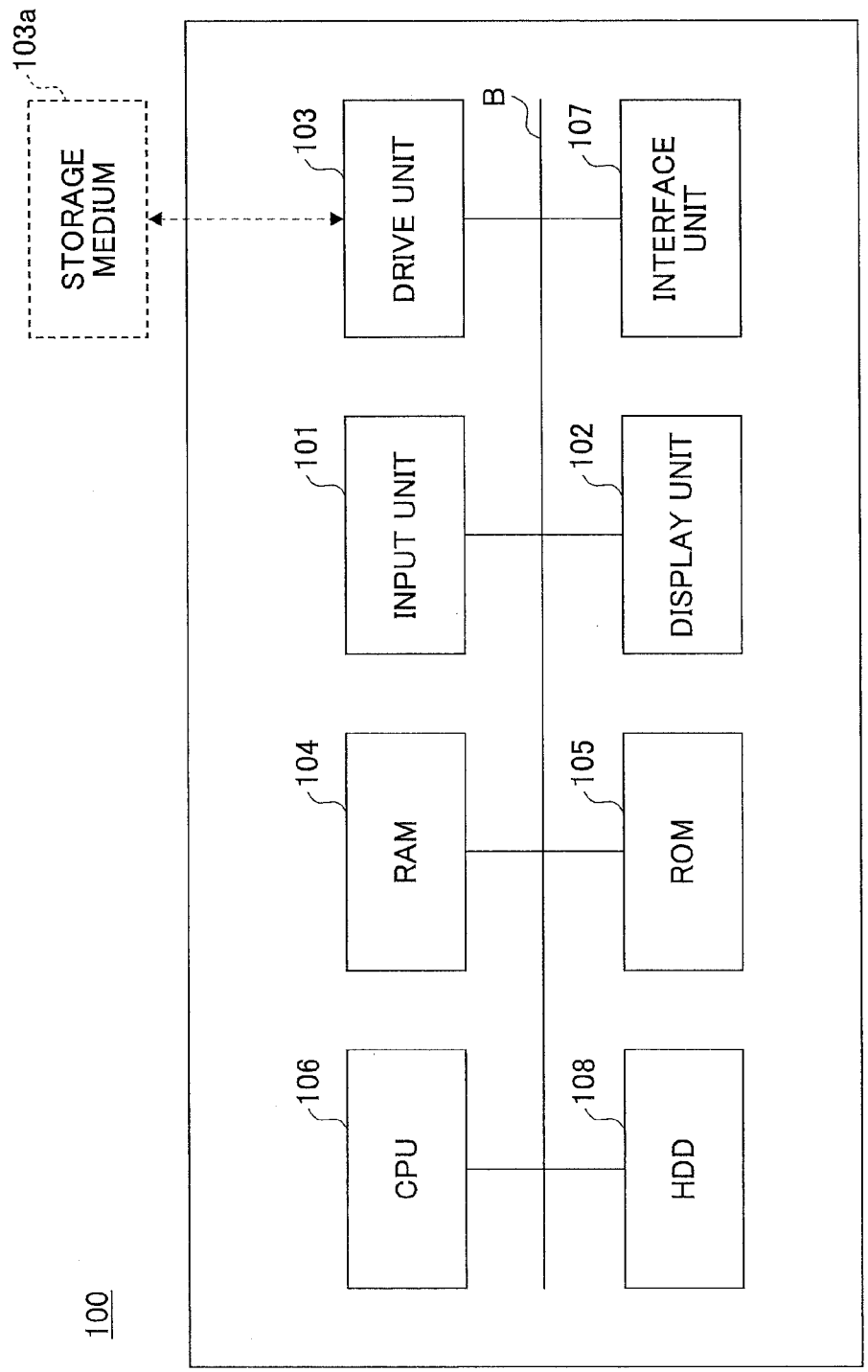
FIG. 2 is a block diagram illustrating an exemplary hardware configuration of an information processing apparatus according to the first embodiment.

FIG. 2 is a block diagram illustrating an exemplary hardware configuration of the information processing apparatus 100 of this embodiment.

As illustrated in FIG. 2, the information processing apparatus 100 includes an input unit 101, a display unit 102, a drive unit 103, a random access memory (RAM) 104, a read only memory (ROM) 105, a central processing unit (CPU) 106, an interface unit 107, and a hard disk drive (HDD) 108 that are connected to each other via a bus B.

The input unit 101 includes, for example, a keyboard and a mouse, and is used to input instructions (or operation signals) to the information processing apparatus 100. The display unit 102 displays, for example, processing results of the information processing apparatus 100.

The interface unit 107 connects the information processing apparatus 100 to the data communication channel N. The information processing apparatus 100 can communicate with external apparatuses having communication units via the interface unit 107.

The HDD 108 is a non-volatile storage medium for storing various programs and data. For example, the HDD 108 stores basic software (e.g., an operating system such as Windows (trademark/registered trademark) or UNIX (trademark/registered trademark)) for controlling the entire information processing apparatus 100, and applications for implementing various functions. The HDD 108 may manage the stored programs and data using a file system and/or a database (DB).

The drive unit 103 is an interface between the information processing apparatus 100 and a removable storage medium 103a. The information processing apparatus 100 can read and write data from and to the storage medium 103a via the drive unit 103. Examples of the storage medium 103a include a floppy (flexible) disk (FD), a compact disk (CD), a digital versatile disk (DVD), an SD memory card, and a universal serial bus (USB) memory.

The ROM 105 is a non-volatile semiconductor memory (storage unit) that can retain data even when the power is turned off. For example, the ROM 105 stores programs and data such as a basic input/output system (BIOS) that is executed when the information processing apparatus 100 is turned on, and system and network settings of the information processing apparatus 100. The RAM 104 is a volatile semiconductor memory (storage unit) for temporarily storing programs and data. The CPU 106 loads programs and data from storage units (e.g., the HDD 108 and the ROM 105) into the RAM 104 and executes the loaded programs to control the information processing apparatus 100 and to perform various functions.

With the above hardware configuration, the information processing apparatus 100 can provide various information processing functions (information processing services).

<Image Processing Apparatus>

Figure 3:
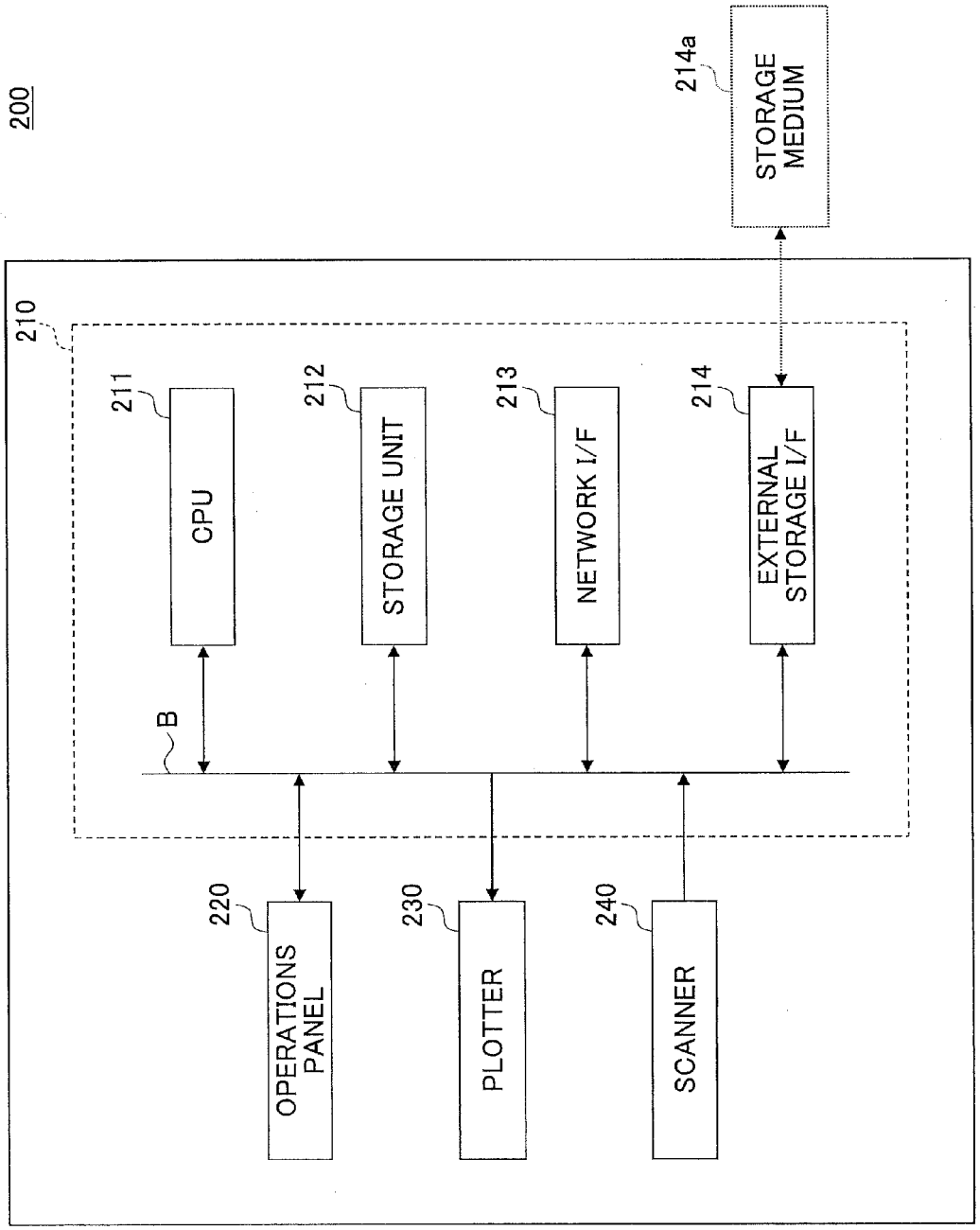
FIG. 3 is a block diagram illustrating an exemplary hardware configuration of an image processing apparatus according to the first embodiment.

FIG. 3 is a block diagram illustrating an exemplary hardware configuration of the image processing apparatus 200 of the first embodiment.

As illustrated in FIG. 3, the image processing apparatus 200 includes a controller 210, an operations panel 220, a plotter 230, and a scanner 240 that are connected to each other via a bus B.

The operations panel 220 includes a display unit for providing information such as apparatus information to the user and an input unit for receiving user inputs such as settings and instructions. The plotter 230 includes an image forming unit for forming an image on a recording medium (e.g., paper). For example, the plotter 230 forms an image by electrophotography or inkjet printing. The scanner 240 optically scans a document and generates image data.

The controller 210 is a control board and includes a CPU 211, a storage unit 212, a network I/F 213, and an external storage I/F 214 that are connected via the bus B.

The CPU 211 executes programs and thereby controls the entire image processing apparatus 200. The storage unit 212 stores programs and data (e.g., image data). The storage unit 212, for example, includes a RAM as a volatile memory, a ROM as a non-volatile memory, and an HDD as a mass storage device. The RAM is used as a work area (a storage area where programs and data are temporarily stored) by the CPU 211. The ROM and the HDD store the programs and data. For example, the ROM stores basic software (operating system) for controlling the image processing apparatus 200. The CPU 211 loads the programs from the ROM into the RAM and executes the loaded programs.

The network I/F 213 is an interface for connecting the image processing apparatus 200 to the data communication channel N. With the network I/F 213, the image processing apparatus 200 can perform data communications with external apparatuses having communication units.

The external storage I/F 214 is an interface for connecting a storage medium 214a used as an external storage to the image processing apparatus 200. The image processing apparatus 200 can read and write data from and to the storage medium 214a via the external storage I/F 214. Examples of the storage medium 214a include an SD memory card and a universal serial bus (USB) memory.

With the above hardware configuration, the image processing apparatus 200 can provide various image processing functions (image processing services).

<Image Processing Functions>

Image processing functions of this embodiment are described below.

In the image processing system 1 of this embodiment, the image processing apparatus 200 including hardware components for implementing image processing functions and the information processing apparatus 100 including software programs for implementing the image processing functions collaborate with each other as described below. The image processing apparatus 200 receives an execution request to execute an image processing function (hereafter may be called a requested image processing function) from a user and sends the execution request to the information processing apparatus 100. When receiving the execution request, the information processing apparatus 100 executes software programs that implement the requested image processing function according to the execution request. Then, the information processing apparatus 100 sends control commands to the image processing apparatus 200. The control commands request the image processing apparatus 200 to control or drive hardware components used to perform image processing (hereafter may be called requested image processing) corresponding to the requested image processing function. The image processing apparatus 200 controls the hardware components according to the control commands to perform the requested image processing. In the image processing system 1 of this embodiment, an image processing function is implemented through a process as described above.

The above approach of this embodiment is different from related-art technologies that try to achieve both low production cost and high performance by optimizing the configuration of an image processing apparatus alone.

An image processing apparatus generally includes roughly two groups of software programs to implement image processing functions. One of the groups includes control software programs for controlling hardware components based on control commands. The other one of the groups includes functional software programs that generate the control commands based on execution requests and output the control commands to the control software programs to execute requested image processing functions. Accordingly, the functional software programs are independent of the hardware components of the image processing apparatus.

In the image processing system 1 of this embodiment, the functional software programs are executed on an apparatus (i.e., the information processing apparatus 100) other than the image processing apparatus 200. In other words, the image processing system 1 is a distributed processing system where the control software programs and the functional software programs are executed on different apparatuses. For example, the image processing apparatus 200 receives a request to execute an image processing function, the information processing apparatus 100 executes software programs for implementing the requested image processing function and sends control commands to request the image processing apparatus 200 to drive hardware components to perform image processing corresponding to the requested image processing function.

Thus, the image processing system 1 of this embodiment is configured to perform image processing through collaboration between apparatuses having communication units.

In the related art, when a function is added to an image processing apparatus, a functional software program for the additional function is installed in a storage unit of a controller of the image processing apparatus and executed by a CPU of the controller. With this configuration, to improve the performance of the image processing apparatus, it is necessary to upgrade the controller (i.e., to upgrade the hardware). However, due to the compatibility with other hardware components and limited space in the image processing apparatus, it is difficult to replace the controller with one having higher performance.

Meanwhile, in the image processing system 1 of this embodiment, functional software programs are executed on a general-purpose apparatus (i.e., the information processing apparatus 100 implemented by, for example, a personal computer). This configuration makes it possible to improve the performance or to upgrade the hardware in an inexpensive manner.

Accordingly, the above configuration of the image processing system 1 makes it possible to achieve both low production cost and high performance in a flexible manner.

Exemplary software configurations and operations of the image processing system 1 are described below.

Figure 4:
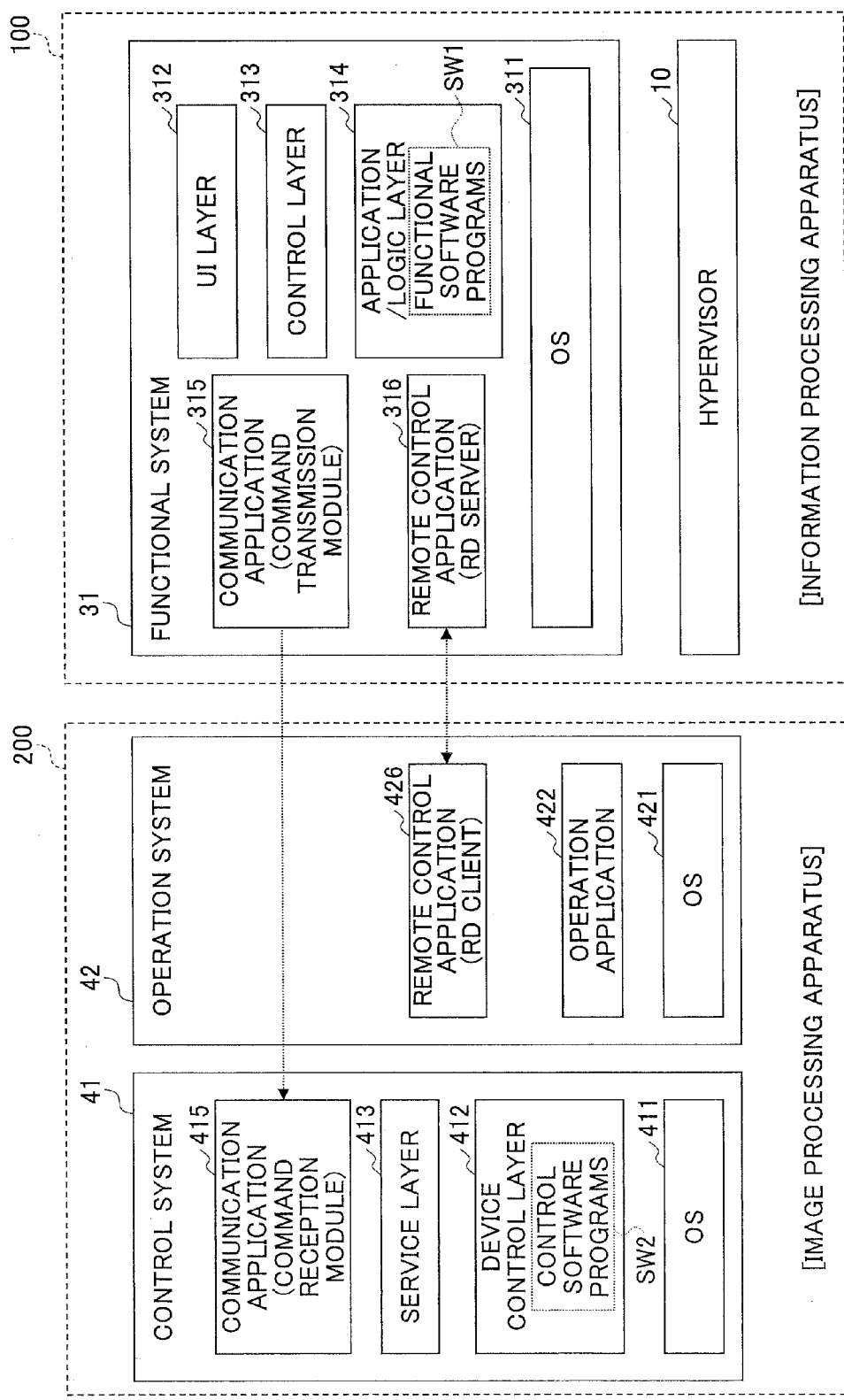
FIG. 4 is a block diagram illustrating an exemplary software configuration of the image processing system according to the first embodiment.

FIG. 4 is a block diagram illustrating an exemplary software configuration of the image processing system 1.

As illustrated in FIG. 4, the information processing apparatus 100 may include a functional system 31 and the image processing apparatus 200 may include a control system 41 and an operation system 42.

The functional system 31 of the information processing apparatus 100 includes software components that execute functional software programs for implementing a requested image processing function and send control commands that request the image processing apparatus 200 to control hardware components to perform requested image processing corresponding to the requested image processing function.

The control system 41 of the image processing apparatus 200 includes software components that control the hardware components according to the control commands received from the information processing apparatus 100 to perform the requested image processing.

The operation system 42 of the image processing apparatus 200 includes software components that receive an execution request for an image processing function from the user and send the execution request to the information processing apparatus 100.

Thus, in the image processing system 1 of this embodiment, the systems of the information processing apparatus 100 and the image processing apparatus 200 communicate with each other via the communication units (i.e., the interface unit 107 and the network I/F 213) to enable collaboration between control software programs SW2 and functional software programs SW1 that are executed in a distributed manner on the respective apparatuses 100 and 200.

<Functional System>

The information processing apparatus 100 of this embodiment may also include a hypervisor 10. The hypervisor 10 is a software program that virtualizes hardware resources to provide multiple virtual machines and thereby logically partitions the hardware resources.

The hypervisor 10 treats an operating system and software running on the operating system as one system and enables the system to recognize the hardware resources as a virtual machine. In other words, the hypervisor 10 makes it possible to run multiple systems concurrently on a single set of hardware resources.

In the information processing apparatus 100, the hypervisor 10 appropriately assigns hardware resources to an OS 311 of the functional system 31 that runs in a logical partition.

The functional system 31 includes software layers and programs such as a UI layer 312, a control layer 313, an application/logic layer 314, a communication application 315, and a remote control application 316 that run on the OS 311.

The UI layer 312 includes information output software that generates and outputs (i.e., displays on the operations panel 220) screens for image processing functions, and information input software that receives operation information (e.g., execution requests and execution conditions) for the image processing functions.

The control layer 313 includes control software that controls processes to implement requested image processing functions. The application/logic layer 314 includes the functional software programs SW1 that perform processes to implement requested image processing functions.

In other words, the control layer 313 executes the functional software programs SW1 of the application/logic layer 314 to implement requested image processing functions.

The functional software programs SW1 are software components that implement basic functions for image processing and provide image processing services to the user. Here, "image processing" indicates a process from the reception of a request to the output of processed information (or an image). For example, image processing of a multifunction peripheral includes "copying". "Basic functions" include input, processing, and output functions for the image processing. For example, basic functions of a multifunction peripheral include a scanning function (input function) and a printing function (output function). Thus, the functional software programs SW1 are functional modules or software components that perform process steps corresponding to the hardware components of the image processing apparatus 200.

When an execution request to execute an image processing function is received, the control layer 313 executes one or more of the functional software programs SW1 of the application/logic layer 314 to implement the requested image processing function. For example, when a copying process is requested, the control layer 313 executes the functional software programs SW1 corresponding to the scanning function and the printing function. Thus, in this embodiment, an image processing function is implemented by a combination of the functional software programs SW1.

The communication application 315 is a command transmission module that sends control commands to the image processing apparatus 200 to request the image processing apparatus 200 to control hardware components to perform image processing corresponding to the requested image processing function. The control commands are generated by the functional software programs SW1 that are controlled by the control layer 313 and are converted by the communication application 315 into formats that are transmittable between the information processing apparatus 100 and the image processing apparatus 200.

The remote control application 316 enables the information processing apparatus 100 to remotely control the image processing apparatus 200. For example, the remote control application 316 may be implemented by a remote desktop (RD) server module that causes the information processing apparatus 100 to function as an RD server.

In the functional system 31, the constituent layers and programs collaborate with each other as described below. The UI layer 312 receives an execution request from the image processing apparatus 200 and sends the received execution request to the control layer 313. The control layer 313 executes one or more of the functional software programs SW1 of the application/logic layer 314 according to the execution request. The executed functional software programs SW1 generate control commands and the application/logic layer 314 sends the control commands to the communication application 315. The communication application 315 converts the control commands and sends the converted control commands to the image processing apparatus 200 that has sent the execution request.

<Control System>

The control system 41 includes software layers and programs such as a device control layer 412, a service layer 413, and a communication application 415 that run on an OS 411.

The device control layer 412 includes the control software programs SW2 for controlling hardware components of the image processing apparatus 200. The control software programs SW2 control the corresponding hardware components of the image processing apparatus 200. For example, the device control layer 412 includes the control software programs SW2 corresponding to the storage unit 212, the plotter 230, and the scanner 240. Thus, the control software programs SW2 are device control modules or software components that control the corresponding hardware components of the image processing apparatus 200.

The device control layer 412 executes the control software programs SW2 corresponding to hardware components used for requested image processing according to the control commands. For example, when a copying process (copying function) is requested, the device control layer 412 executes the control software programs SW2 corresponding to the storage unit 212, the plotter 230, and the scanner 240 to control the hardware components. Thus, in this embodiment, device control for image processing is performed using a combination of the control software programs SW2.

The service layer 413 includes I/F software that interfaces the control system 41 with the functional system 31 of the information processing apparatus 100. In other words, the service layer 413 provides an interface that enables the functional system 31 to be independent of the hardware components of the image processing apparatus 200.

The communication application 415 is a command reception module that receives control commands sent from the information processing apparatus 100. More specifically, the communication application 415 receives converted control commands from the communication application 315 of the information processing apparatus 100.

In the control system 41, the constituent layers and software programs collaborate with each other as described below. The communication application 415 receives control commands from the information processing apparatus 100, and sends the received control commands via the service layer 413 to the device control layer 412.

The device control layer 412 executes the control software programs SW2 based on the control commands. As a result, requested image processing is performed by the image processing apparatus 200.

<Operation System>

The operation system 42 includes software components such as an operation application 422 and a remote control application 426 that run on an OS 421.

The operation application 422 displays screens on the operations panel 220 of the image processing apparatus 200.

The remote control application 426 is a remote control reception program that receives remote control commands from the information processing apparatus 100. For example, the remote control application 426 may be implemented by a remote desktop (RD) client module that causes the image processing apparatus 200 to function as an RD client.

An exemplary remote control process between the RD server and the RD client in the image processing system 1 of this embodiment is described below.

Figure 5:
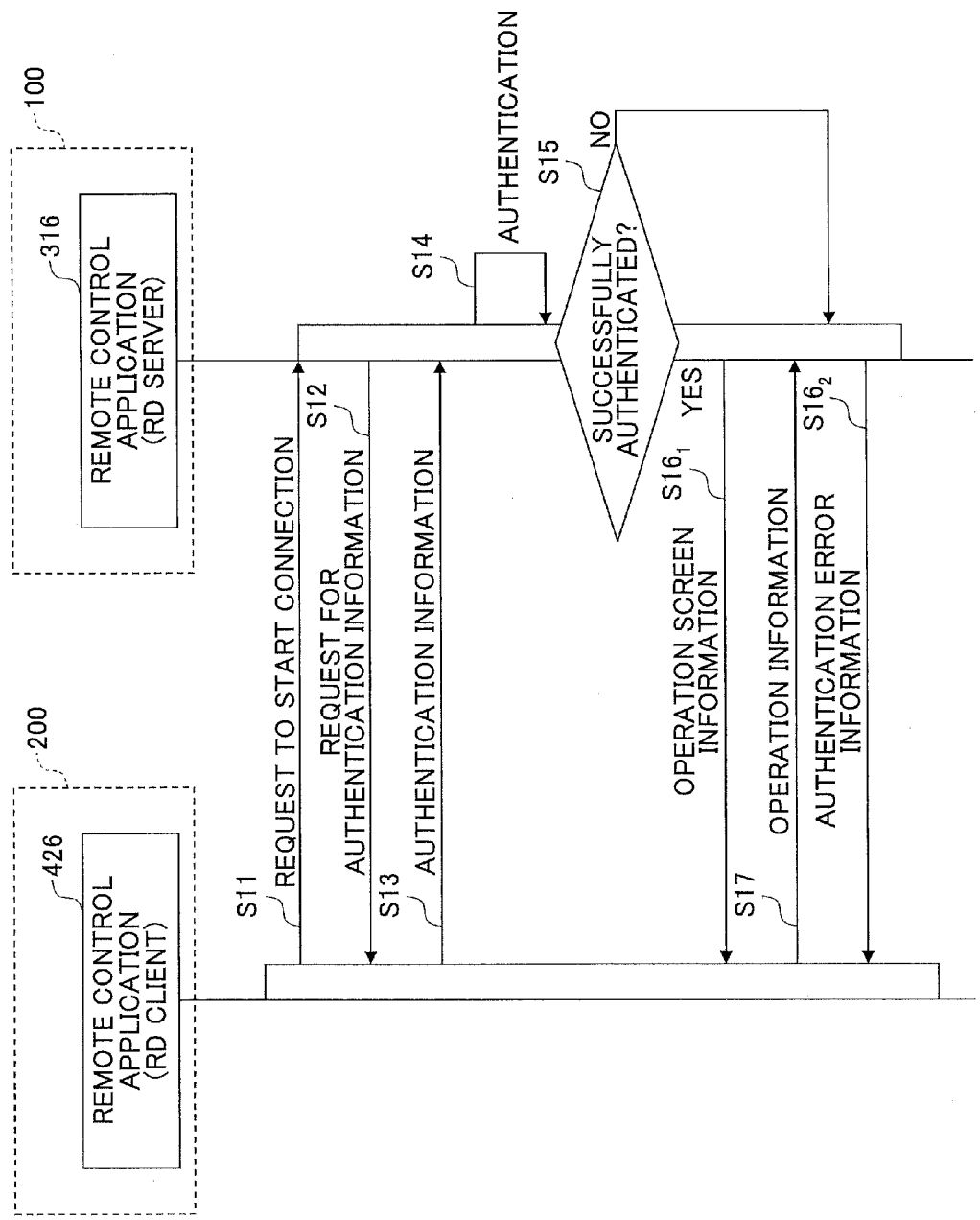
FIG. 5 is a sequence chart illustrating an exemplary remote control process according to the first embodiment.

FIG. 5 is a sequence chart illustrating an exemplary remote control process according to the first embodiment. The remote control process of FIG. 5 is performed between the functional system 31 of the information processing apparatus 100 and the operation system 42 of the image processing apparatus 200 (more specifically, between the remote control application 316 and the remote control application 426).

As illustrated in FIG. 5, the remote control application (RD client) 426 of the image processing apparatus 200 sends a request to start connection to the information processing apparatus 100 (step S11). For example, the remote control application (RD client) 426 sends the request to start connection based on a network parameter (e.g., an IP address) of the information processing apparatus 100.

The remote control application (RD server) 316 of the information processing apparatus 100 sends a request for authentication information to the image processing apparatus 200 that has sent the request to start connection (step S12).

For example, the remote control application (RD server) 316 sends the request for authentication information based on a network parameter of the image processing apparatus 200 received with the request to start connection.

The remote control application (RD client) 426 of the image processing apparatus 200 sends authentication information for connection to the information processing apparatus 100 that has sent the request for authentication information (step S13).

When receiving the authentication information, the remote control application (RD server) 316 performs an authentication process based on the authentication information (step S14).

When the image processing apparatus 200 is successfully authenticated (YES in step S15), the remote control application (RD server) 316 sends operation screen information (step S16$_1$) to the image processing apparatus 200 that has sent the authentication information. The operation screen information is generated, for example, by the UI layer 312.

Based on the operation screen information, the operation application 422 of the image processing apparatus 200 displays an operation screen on the operations panel 220. On the operation screen, the user inputs operation information such as an execution request and execution conditions. The remote control application (RD client) 426 sends the input operation information to the information processing apparatus 100 that has sent the operation screen information (step S17).

As described above, in the image processing system 1 of this embodiment, the RD server of the information processing apparatus 100 receives a request to start connection from the RD client of the image processing apparatus 200 and authenticates the RD client. When the RD client is successfully authenticated, the information processing apparatus 100 becomes able to remotely control the image processing apparatus 200.

Meanwhile, when the image processing apparatus 200 is not successfully authenticated (NO in step S15), the remote control application (RD server) 316 sends authentication error information (step S16$_2$) to the image processing apparatus 200 that has sent the authentication information.

Based on the authentication error information, the operation application 422 of the image processing apparatus 200 displays an error screen on the operations panel 220 to report to the user that the authentication has resulted in an error and the process is terminated.

As described above, in the image processing system 1 of this embodiment, a virtual machine (VM) environment where the functional system 31 runs is set up in the information processing apparatus 100 and software for data communications (including communications for remote control) is provided in each of the information processing apparatus 100 and the image processing apparatus 200. This software configuration enables the information processing apparatus 100 and the image processing apparatus 200 to collaborate with each other to share the processing load and thereby makes it possible to share and optimize hardware resources.

An exemplary functional configuration of the image processing system 1 implemented by the above software configuration is described below.

Figure 6:
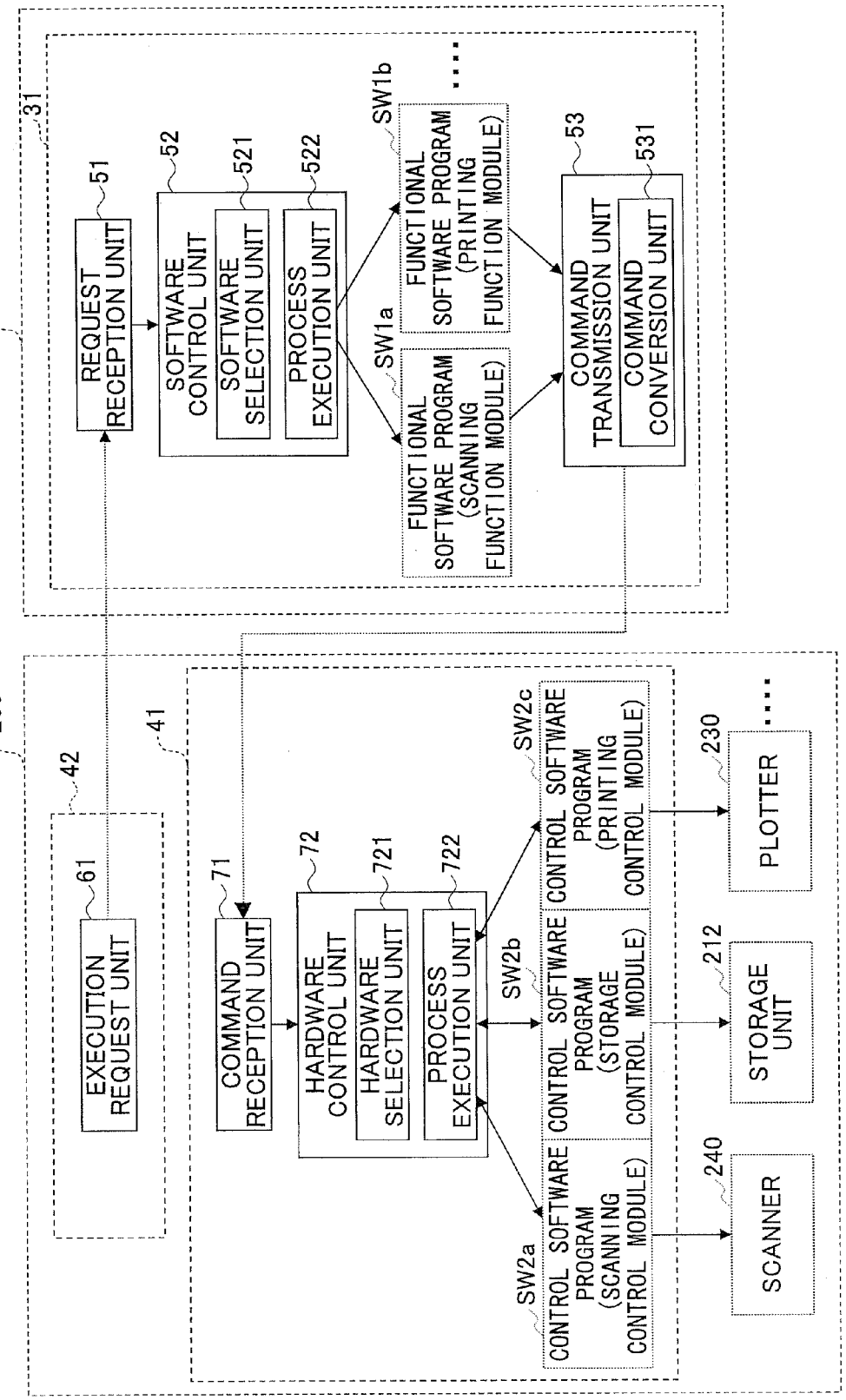
FIG. 6 is a block diagram illustrating an exemplary functional configuration of the image processing system according to the first embodiment.

FIG. 6 is a block diagram illustrating an exemplary functional configuration of the image processing system 1 of the first embodiment.

As illustrated in FIG. 6, the information processing apparatus 100 includes a request reception unit 51, a software control unit 52, and a command transmission unit 53; and the image processing apparatus 200 includes an execution request unit 61, a command reception unit 71, and a hardware control unit 72.

The request reception unit 51, the software control unit 52, and the command transmission unit 53 are functional units implemented by the functional system 31 of the information processing apparatus 100.

The command reception unit 71 and the hardware control unit 72 are functional units implemented by the control system 41 of the image processing apparatus 200, and the execution request unit 61 is a functional unit implemented by the operation system 42 of the image processing apparatus 200.

<Functional Units of Information Processing Apparatus>

The request reception unit 51 receives an execution request to execute an image processing function from the image processing apparatus 200 and is implemented by software provided in the UI layer 312. More specifically, the request reception unit 51 receives an execution request via the remote control application 316 from the image processing apparatus 200 that has become remotely controllable (i.e., has been successfully authenticated) by the information processing apparatus 100.

The software control unit 52 executes one or more of the functional software programs SW1 that implement the requested image processing function based on the execution request, and is implemented by software provided in the control layer 313. More specifically, the software control unit 52 selects, based on the execution request, one or more of the functional software programs SW1 of the application/logic layer 314 corresponding to the requested image processing function, and executes the selected functional software programs SW1. For this purpose, the software control unit 52 includes a software selection unit 521 and a process execution unit 522.

For example, when an execution request to perform a copying process (copying function) is received, the software selection unit 521 selects a functional software program SW1a (scanning function module) for a scanning function and a functional software program SW1b (printing function module) for a printing function based on basic functions "document scanning" and "printing" specified in execution request information in the execution request. Then, the process execution unit 522 executes the selected functional software programs SW1a and SW1b. More specifically, the process execution unit 522 executes the functional software programs SW1a and SW1b according to execution condition information indicating execution conditions of the basic functions in the execution request information. For example, the process execution unit 522 specifies the execution conditions as parameters (or arguments) of the functional software programs SW1a and SW1b (function modules).

The command transmission unit 53 sends control commands to the image processing apparatus 200 that has sent the execution request, and is implemented by the communication application 315. The control commands request the image processing apparatus 200 to drive hardware components used to perform requested image processing corresponding to the requested image processing function. More specifically, the command transmission unit 53 converts the control commands generated by the functional software programs SW1 according to the execution conditions into formats that are transmittable from the information processing apparatus 100 to the image processing apparatus 200. For this purpose, the command transmission unit 53 includes a command conversion unit 531.

For example, the command conversion unit 531 converts the control commands into transmission data according to a communication protocol used between the information processing apparatus 100 and the image processing apparatus 200.

Thus, in the image processing system 1 of this embodiment, when an execution request is received from the image processing apparatus 200 by the request reception unit 51 of the information processing apparatus 100, the software control unit 52 executes one or more of the functional software programs SW1 that implement a requested image processing function, and the command transmission unit 53 sends control commands to request the image processing apparatus 200 to control hardware components used to perform image processing corresponding to the requested image processing function.

<Functional Units of Image Processing Apparatus>

The execution request unit 61 requests the information processing apparatus 100 to execute an image processing function requested via an operation screen by the user and is implemented by the operation application 422. More specifically, the execution request unit 61 sends an execution request via the remote control application 426 to the information processing apparatus 100 that in response to the execution request, authenticates and remotely controls the image processing apparatus 200.

The command reception unit 71 receives control commands sent from the information processing apparatus 100 and is implemented by the communication application 415. The command reception unit 71 buffers the control commands in the order received.

The hardware control unit 72 controls the hardware components of the image processing apparatus 200 based on the control commands to perform requested image processing corresponding to the requested image processing function, and is implemented by software provided in the service layer 413 and the device control layer 412. More specifically, the hardware control unit selects, based on the control commands, hardware components of the image processing apparatus 200 used to perform the requested image processing, and executes the control software programs SW2 corresponding to the selected hardware components. For this purpose, the hardware control unit 72 includes a hardware selection unit 721 and a process execution unit 722.

For example, the hardware selection unit 721 selects the scanner 240, the storage unit 212, and the plotter 230 based on operation conditions (operation condition information) "scanning document", "storing scanned image", and "printing stored image" included in control command information in the control commands. Then, the process execution unit 722 executes a control software program SW2a (scanning control module), a control software program SW2b (storage control module), and a control software program SW2c (printing control module) corresponding to the scanner 240, the storage unit 212, and the plotter 230 that have been selected. More specifically, the process execution unit 722 executes the control software programs SW2a, SW2b, and SW2c according to the operation condition information in the control command information. For example, the process execution unit 722 specifies the operation conditions as parameters (or arguments) of the control software programs SW2a, SW2b, and SW2c (device control modules). As a result, the requested image processing is performed by the hardware components of the image processing apparatus 200.

The hardware control unit 72 may also control the order and timing of driving the hardware components used for the image processing.

In this embodiment, as described above, a requested image processing function is implemented by a combination of basic functions (input, processing, and output functions). Therefore, the order and timing of driving hardware components are determined by the order the basic functions are executed or the order of process steps to be performed for the requested image processing.

For example, a copying process is an image processing function that is implemented by a combination of a scanning function and a printing function (basic functions). The operation condition information for copying may include operation conditions "scanning document", "storing scanned image", and "printing stored image". That is, in a copying process, the scanner 240 scans a document to obtain an image and temporarily stores the obtained image in the storage unit 212, and the plotter 230 retrieves the image from the storage unit 212 and prints the retrieved image.

Thus, in a copying process, it is necessary to drive the plotter 230 after the image is stored in the storage unit 212. In other words, the timing of driving the plotter 230 depends on the timing of driving the scanner 240. This relationship (or dependency) represents an operation requirement for the plotter 230 and is included as a part of the operation condition information in the control command information for the copying function.

The process execution unit 722 of the hardware control unit 72 executes the control software programs SW2 based on the operation condition information and thereby controls the order and timing of driving hardware components. More specifically, the hardware control unit refers to received control command information and identifies operation requirements (hereafter called operation requirement information) included in operation condition information in the control command information. Then, the hardware control unit 72 determines the order and timing of driving the hardware components used for image processing based on the operation requirement information.

For example, when a copying process is requested, the operation condition information for the storage unit 212 and the operation condition information for the plotter 230 include operation requirement information. The operation requirement information for the storage unit 212 may indicate "after document scanning is completed", and the operation requirement information for the plotter 230 may indicate "after scanned image is stored". In this case, the process execution unit 722 of the hardware control unit 72 first executes the control software program SW2a corresponding to the scanner 240 for which no operation requirement is provided and thereby starts the copying process. Next, the process execution unit 722 executes the control software program SW2b corresponding to the storage unit 212 and the control software program SW2c corresponding to the plotter 230 in this order. In this step, the process execution unit 722 controls the timing of executing the control software programs SW2b and SW2c according to the operation requirements for the storage unit 212 and the plotter 230. Accordingly, the storage unit 212 is driven to store a scanned image after a document is scanned by the scanner 240, and the plotter 230 is driven to print the scanned image after the scanned image is stored in the storage unit 212. Here, it is assumed that a completion report is sent to the hardware control unit 72 from each hardware component used in the image processing via the corresponding control software program SW2.

As described above, in the image processing system 1 of this embodiment, an image processing function is implemented through collaboration of functional units. In other words, an image processing function of this embodiment is implemented by executing software programs installed in apparatuses constituting the image processing system 1. More particularly, in each apparatus, the software programs are loaded by a processing unit (e.g., a CPU) from a storage unit (e.g., an HDD or a ROM) into a memory (e.g., a RAM) and are executed to perform processes as described below to implement an image processing function.

An exemplary image processing sequence (communications between functional units) is described in more detail below.

Figure 7:
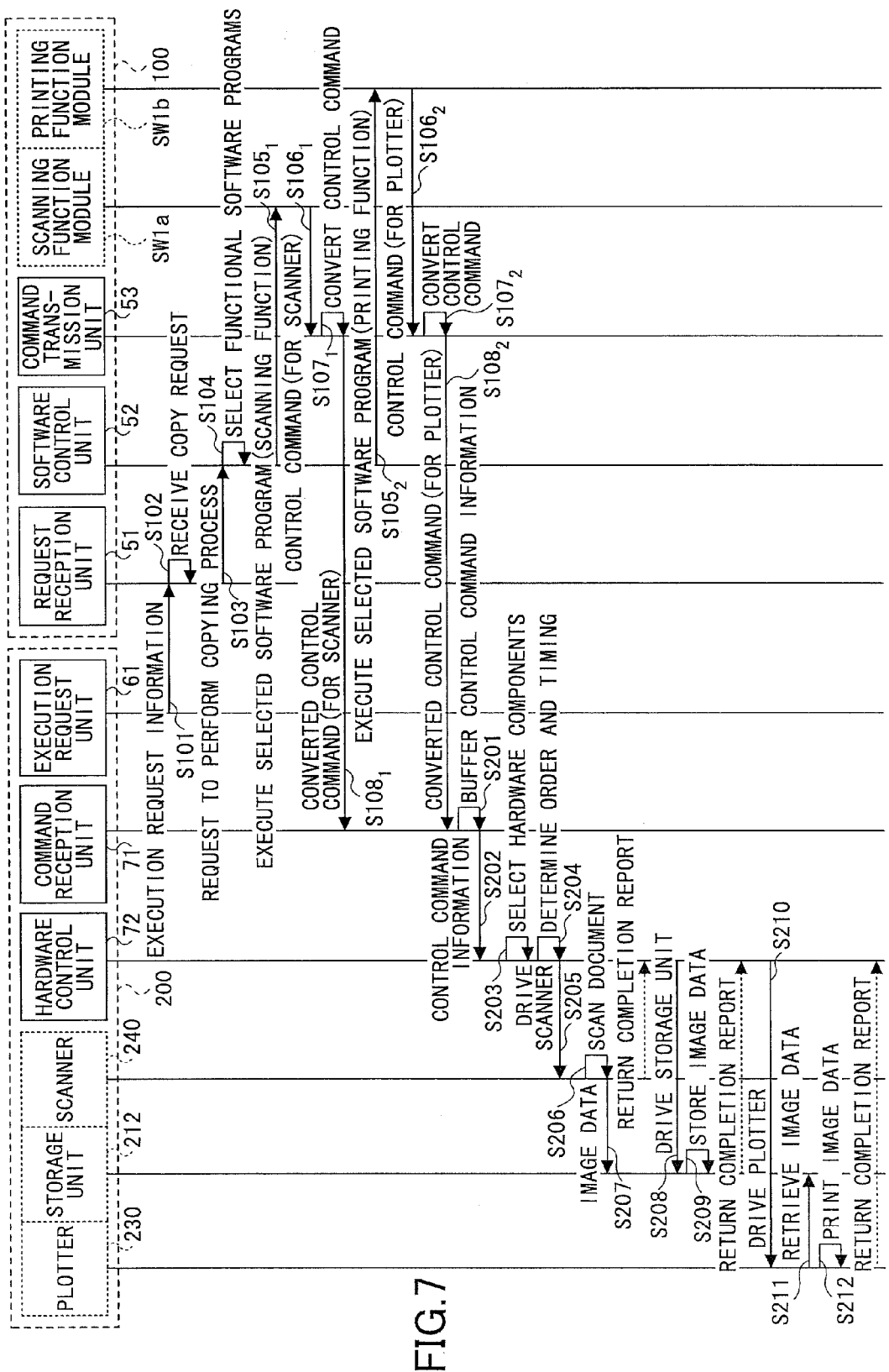
FIG. 7 is a sequence chart illustrating an exemplary image processing sequence according to the first embodiment.

FIG. 7 is a sequence chart illustrating an exemplary image processing sequence according to the first embodiment.

As illustrated in FIG. 7, the execution request unit 61 of the image processing apparatus 200 sends execution request information (or an execution request), which has been received via an operation screen, to the information processing apparatus 100 (step S101). For example, when a copying process (or function) is requested, execution request information including execution condition information for the copying process is sent to the information processing apparatus 100.

The request reception unit 51 of the information processing apparatus 100 receives the execution request information, i.e., receives a copy request (step S102).

Next, the request reception unit 51 requests the software control unit 52 to perform the copying process (step S103) and sends the execution request information to the software control unit 52.

Based on the execution request information, the software selection unit 521 of the software control unit selects the functional software programs SW1 corresponding to the basic functions needed to perform the copying process (step S104). In this exemplary process, the software selection unit 521 selects the functional software programs SW1$a$ and SW1$b$ corresponding to the scanning function and the printing function.

Next, the process execution unit 522 of the software control unit 52 executes the selected functional software programs SW1$a$ and SW1$b$ (steps S105$_1$ and S105$_2$). Based on execution conditions specified by the process execution unit 522, the executed functional software programs SW1$a$ and SW1$b$ generate control commands for hardware components used for the copying process and send them to the command transmission unit 53 (steps S106$_1$ and S106$_2$). The command transmission unit 53 converts the control commands into data formats that are transmittable to the image processing apparatus 200 (steps S107$_1$ and S107$_2$). For example, the command transmission unit 53 converts the control commands into transmission data according to a communication protocol used between the information processing apparatus 100 and the image processing apparatus 200.

Then, the command transmission unit 53 sends the converted control commands (transmission data) to the image processing apparatus 200 (steps S108$_1$ and S108$_2$).

For example, the command transmission unit 53 sends the transmission data to the image processing apparatus 200 based on a network parameter obtained during a connection process for remote control.

Steps S105 through S108 are described in more detail.

The process execution unit 522 of the software control unit 52 executes the selected functional software program SW1$a$ based on the execution condition information for the scanning function included in the execution request information (step S105$_1$). More specifically, the process execution unit 522 specifies an execution condition in the execution condition information as a parameter (or argument) of the functional software program SW1$a$ and executes the functional software program SW1$a$.

Based on the specified execution condition, the functional software program SW1$a$ sends a control command for the scanner 240 to the command transmission unit 53 (step S106$_1$). The command transmission unit 53 converts the control command into a data format that is transmittable to the image processing apparatus 200 (step S107$_1$) and sends the converted control command (transmission data) to the image processing apparatus 200 (step S108$_1$).

The process execution unit 522 of the software control unit 52 also executes the selected functional software program SW1$b$ based on the execution condition information for the printing function included in the execution request information (step S105$_2$). More specifically, the process execution unit 522 specifies an execution condition in the execution condition information as a parameter (or argument) of the functional software program SW1$b$ and executes the functional software program SW1$b$.

Based on the specified execution condition, the functional software program SW1$b$ sends a control command for the plotter 230 to the command transmission unit 53 (step S106$_2$). The command transmission unit 53 converts the control command into data format that is transmittable to the image processing apparatus 200 (step S107$_2$), and sends the converted control command (transmission data) to the image processing apparatus 200 (step S108$_2$).

In FIG. 7, multiple sets of steps S105 through S108 (S105$_1$ through S108$_1$ and S105$_2$ through S108$_2$) are performed in sequence for the basic functions implementing the image processing function. However, steps S105 through S108 may be performed in a different manner. For example, since steps S105 through S108 are independent of actual operations of hardware components, multiple sets of steps S105 through S108 may be performed in parallel to reduce the processing time.

The command reception unit 71 of the image processing apparatus 200 receives the transmission data (the converted control commands) from the information processing apparatus 100 as control command information for the hardware components used for the copying process and buffers the control command information (step S201).

Next, the command reception unit 71 sends the control command information to the hardware control unit (step S202).

Based on the control command information, the hardware selection unit 721 of the hardware control unit 72 selects hardware components needed to perform the copying process (step S203). In this exemplary process, the hardware selection unit 721 selects the storage unit 212, the plotter 230, and the scanner 240 (or selects the control software programs SW2$a$, SW2$b$, and SW2$c$ corresponding to those hardware components).

Next, the process execution unit 722 of the hardware control unit 72 determines the order and timing of driving the selected hardware components based on operation condition information in the control command information (step S204). More specifically, the process execution unit 722 determines the order and timing of driving the hardware components based on operation requirement information in the operation condition information provided for each of the storage unit 212, the plotter 230, and the scanner 240. Here, it is assumed that the operation requirement for the storage unit 212 is "after document scanning is completed" and the operation requirement for the plotter 230 is "after scanned image is stored". According to the operation requirements, the process execution unit 722 determines the order and timing of driving the hardware components such that the scanner 240 is driven first to scan a document to obtain an image, the storage unit 212 is driven next to store the obtained image, and the plotter 230 is then driven to print the stored image.

Next, the process execution unit 722 of the hardware control unit 72 executes the control software program SW2a corresponding to the scanner 240 according to the determined timing of driving the scanner 240 (step S205). More specifically, the process execution unit 722 specifies the operation condition information of the scanner 240 as a parameter (or argument) of the control software program SW2a and executes the control software program SW2a.

As a result, the scanner 240 scans a document (step S206) to obtain an image, writes the obtained image into a predetermined storage area of the storage unit 212 (step S207), and returns a scanning completion report via the control software program SW2a to the hardware control unit 72.

When receiving the scanning completion report, the process execution unit 722 of the hardware control unit 72 executes the control software program SW2b corresponding to the storage unit 212 according to the determined timing of driving the storage unit 212 (step S208). More specifically, the process execution unit 722 specifies the operation condition information of the storage unit 212 as a parameter (or argument) of the control software program SW2b and executes the control software program SW2b.

As a result, the storage unit 212 (temporarily) stores the obtained image as image data (step S209) and returns an image storing completion report via the control software program SW2b to the hardware control unit 72.

When receiving the image storing completion report, the process execution unit 722 of the hardware control unit 72 executes the control software program SW2c corresponding to the plotter 230 according to the determined timing of driving the plotter 230 (step S210).

More specifically, the process execution unit 722 specifies the operation condition information of the plotter 230 as a parameter (or argument) of the control software program SW2c and executes the control software program SW2c.

As a result, the plotter 230 retrieves the image data from the storage unit 212 (step S211), prints the image data (step S212), and returns a printing completion report via the control software program SW2c to the hardware control unit 72.

Thus, in the image processing system 1 of this embodiment, a requested image processing function is implemented through collaboration between the information processing apparatus 100 and the image processing apparatus 200.

In short, in the image processing system 1 of the first embodiment, the image processing apparatus 200 including hardware components for implementing image processing functions and the information processing apparatus 100 including software programs for implementing the image processing functions collaborate with each other as described below.

The execution request unit 61 of the image processing apparatus 200 receives an execution request to execute an image processing function from a user and sends the execution request to the information processing apparatus 100.

When the execution request is received by the request reception unit 51, the software control unit 52 of the information processing apparatus 100 executes software programs that implement the requested image processing function according to the execution request. Then, the information processing apparatus 100 sends control commands to request the image processing apparatus 200 to drive hardware components used to perform requested image processing corresponding to the requested image processing function.

When the control commands are received by the command reception unit 71, the hardware control unit 72 of the image processing apparatus 200 controls the hardware components according to the control commands to perform the requested image processing.

Thus, the image processing system 1 of this embodiment is configured to perform image processing through collaboration between apparatuses having communication units.

In the image processing system 1 of this embodiment, the information processing apparatus 100 where functional software programs are installed may be implemented by a general-purpose apparatus (e.g., a personal computer). This makes it possible to flexibly upgrade the hardware of the information processing apparatus 100 when new functions are added (i.e., when new functional software programs are installed), and thereby makes it possible to achieve both low production cost and high performance.

Second Embodiment

In the first embodiment, the information processing apparatus 100 includes one functional system 31 running on the hypervisor 10.

With the configuration of the first embodiment, if the functional system 31 fails for some reason, the image processing system 1 becomes unable to provide image processing functions to the user.

In an image processing system of a second embodiment, an information processing apparatus includes multiple functional systems. With this configuration, even if one of the functional systems fails, it is possible to continuously provide image processing functions using another one of the functional systems that is operating normally.

In the second embodiment, descriptions overlapping those in the first embodiment are omitted, and the same reference numbers as those used in the first embodiment are assigned to the corresponding components.

<Software Configuration>

Figure 8:
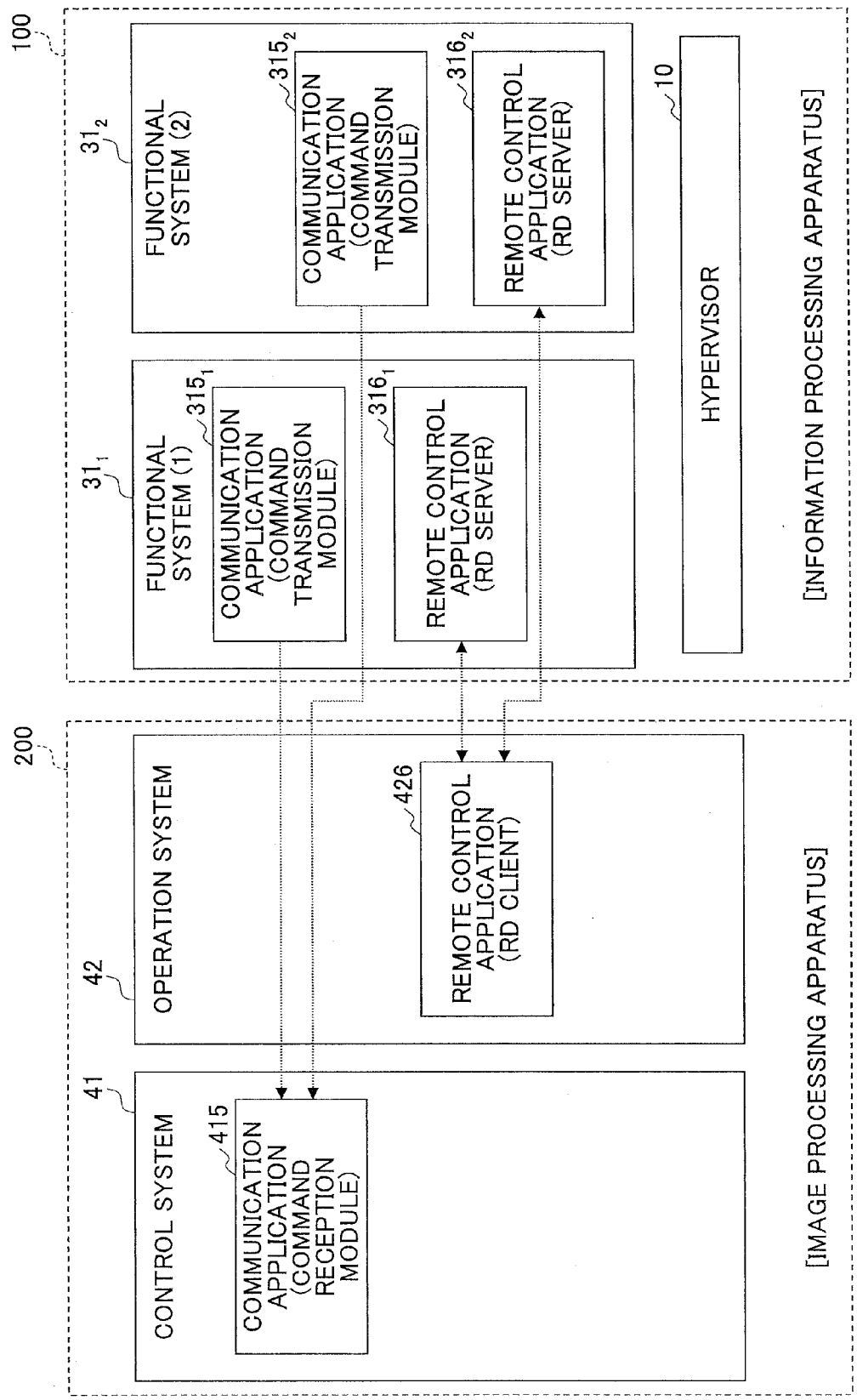
FIG. 8 is a block diagram illustrating an exemplary software configuration of an image processing system according to a second embodiment.

FIG. 8 is a block diagram illustrating an exemplary software configuration of the image processing system 1 according to the second embodiment.

As illustrated in FIG. 8, the information processing apparatus 100 of this embodiment includes functional systems $31_1$ and $31_2$ that run on the hypervisor 10. Thus, the information processing apparatus 100 of this embodiment includes multiple functional systems 31 having substantially the same configuration.

The hypervisor 10 appropriately assigns hardware resources to the functional systems $31_1$ and $31_2$ that run in logical partitions.

The functional systems $31_1$ and $31_2$ have substantially the same configuration, and each of the functional systems $31_1$ and $31_2$ includes a communication application 315 ($315_1$ or $315_2$) and a remote control application ($316_1$ or $316_2$).

Accordingly, in the image processing system 1 of this embodiment, control commands are sent and received between the communication application 415 of the control system 41 of the image processing apparatus 200 and the communication application 315 of one of the functional systems 31 of the information processing apparatus 100. Similarly, communications for remote control are performed between the remote control application 426 of the operation system 42 of the image processing apparatus 200 and the remote control application 316 of one of the functional systems 31 of the information processing apparatus 100.

In the image processing system 1 configured as described above, the operation system 42 of the image processing apparatus 200 switches the functional systems 31 of the information processing apparatus 100 according to the operational status of the functional systems 31 to continuously provide image processing functions.

<Image Processing Functions>

Figure 9:
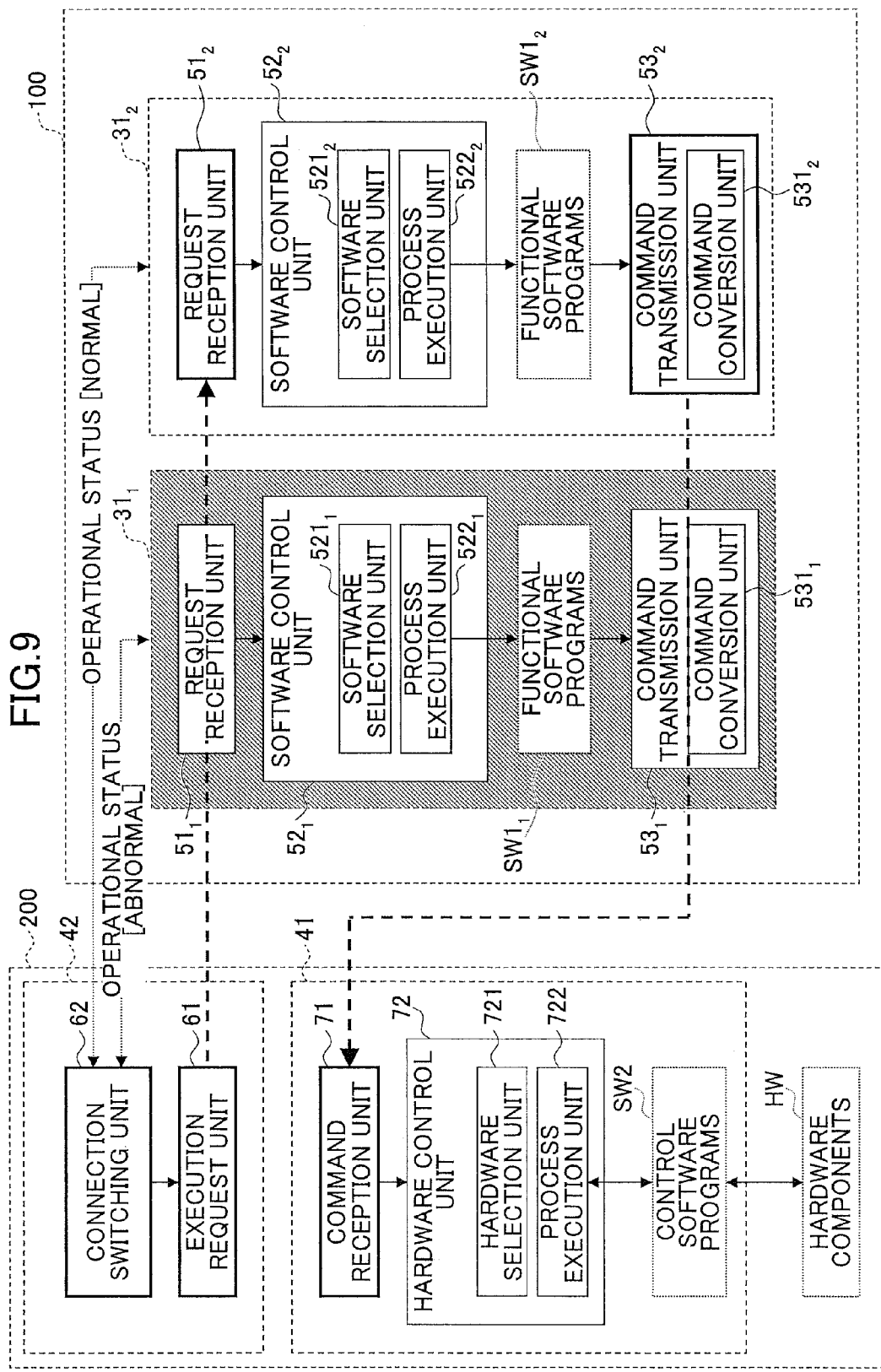
FIG. 9 is a block diagram illustrating an exemplary functional configuration of the image processing system according to the second embodiment.

FIG. 9 is a block diagram illustrating an exemplary functional configuration of the image processing system 1 of the second embodiment.

As illustrated in FIG. 9, in the image processing system 1 of this embodiment, the operation system 42 of the image processing apparatus 200 additionally includes a connection switching unit 62.

The connection switching unit 62 is a functional unit that selects one of the functional systems 31 of the information processing apparatus 100 to be connected with the image processing apparatus 200, i.e., switches the functional systems 31. For example, the connection switching unit 62 switches the functional systems 31 as described below.

The connection switching unit 62 refers to information (hereafter called connection management information) including network parameters of the functional systems 31. Here, since the hypervisor 10 assigns hardware resources to the respective functional systems 31, different network parameters are assigned to the functional systems 31. The network parameters of the functional systems 31 of the information processing apparatus 100 are registered in advance in the connection management information.

Based on the network parameters in the connection management information, the connection switching unit 62 regularly requests the functional systems 31 of the information processing apparatus 100 to send operational status information. Then, based on the operational status information sent from the functional systems 31, the connection switching unit 62 switches the functional systems 31. For example, if operational status information [abnormal] indicating abnormal operational status is sent from the functional system $31_1$ that is currently connected with the image processing apparatus 200, the connection switching unit 62 switches connection to the functional system $31_2$ that has sent operational status information [normal] indicating normal operational status.

After the connection is switched to the functional system $31_2$, the execution request unit 61 of the operation system 42 of the image processing apparatus 200 sends execution request information to the request reception unit $51_2$ of the functional system $31_2$ that is operating normally on the information processing apparatus 100. In response to the execution request information, the command transmission unit $53_2$ of the normally-operating functional system $31_2$ of the information processing apparatus 100 sends control command information to the command reception unit 71 of the control system 41 of the image processing apparatus 200.

An exemplary process performed by the connection switching unit 62 is described in more detail below with reference to a sequence chart. Since the sequence of image processing to be performed after switching the functional systems 31 is substantially the same as in the first embodiment, its descriptions are omitted here. Also in this embodiment, an image processing function is implemented by executing software programs installed in apparatuses constituting the image processing system 1. More particularly, in each apparatus, the software programs are loaded by a processing unit (e.g., a CPU) from a storage unit (e.g., an HDD or a ROM) into a memory (e.g., a RAM) and are executed to perform processes as described below to implement an image processing function.

Figure 10:
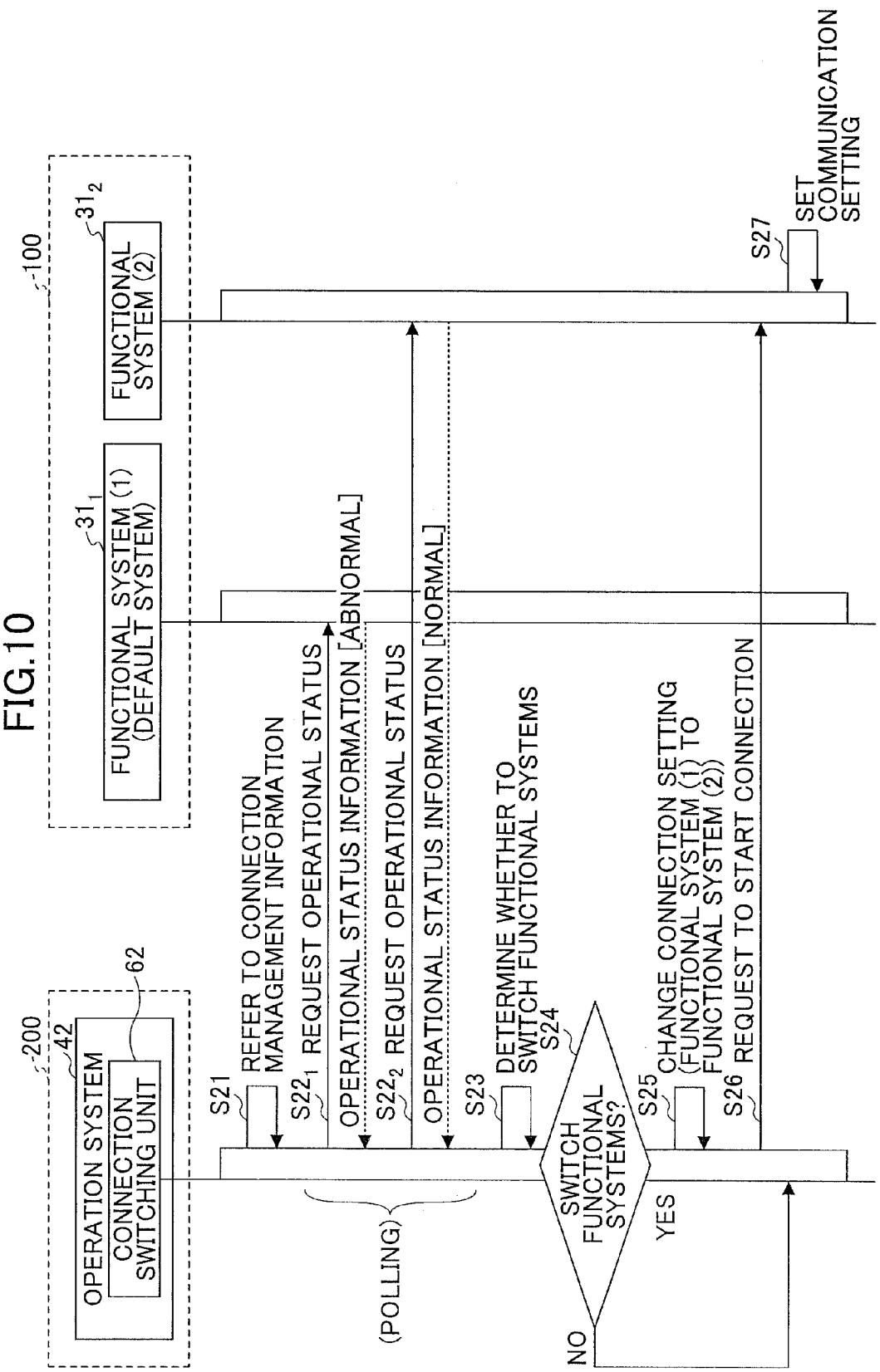
FIG. 10 is a sequence chart illustrating an exemplary process of switching functional systems according to the second embodiment.

FIG. 10 is a sequence chart illustrating an exemplary process of switching the functional systems 31 according to the second embodiment. In the process of FIG. 10, it is assumed that the information processing apparatus 100 includes functional systems $31_1$ and $31_2$ and the image processing apparatus 200 is currently connected with the functional system $31_1$.

As illustrated in FIG. 10, the connection switching unit 62 of the operation system 42 of the image processing apparatus 200 refers to the connection management information (step S21). The connection management information includes network parameters assigned to the functional systems $31_1$ and $31_2$ of the information processing apparatus 100.

Based on the network parameters in the connection management information, the connection switching unit 62 requests the functional systems $31_1$ and $31_2$ to send operational status information indicating their operational status (steps $S22_1$ and $S22_2$). In these steps, the connection switching unit 62 may send information acquisition commands to the functional systems $31_1$ and $31_2$ according to a communication protocol used between the information processing apparatus 100 and the image processing apparatus 200. In response, the functional systems $31_1$ and $31_2$ send the operational status information to the connection switching unit 62. The connection switching unit 62 repeats steps $S22_1$ and $S22_2$ at predetermined intervals. In other words, the connection switching unit 62 polls the functional systems $31_1$ and $31_2$ to check their operational status.

Based on the operational status information received from the functional systems $31_1$ and $31_2$, the connection switching unit 62 determines whether it is necessary to switch the functional systems $31_1$ and $31_2$ (step S23). More specifically, the connection switching unit 62 determines whether it is necessary to switch the functional systems 31 based on the operational status of one of the functional systems 31 (in this example, the functional systems $31_1$) that is currently connected with the image processing apparatus 200. For example, if the operational status of the functional system $31_1$ that is currently connected with the image processing apparatus 200 is "abnormal" and the operational status of the functional system $31_2$ is "normal", the connection switching unit 62 determines to switch the functional systems 31. If the operational status of all the functional systems 31 of the information processing apparatus 100 is "abnormal", the connection switching unit 62 reports an error (e.g., displays an error message on the operations panel 220) and terminates the process.

If it is necessary to switch the functional systems 31 (YES in step S24), the connection switching unit 62 changes a connection setting (or connection destination) to another one of the functional systems 31 (step S25). In this example, the connection switching unit 62 changes the connection setting from the currently-connected functional system $31_1$ to the normally-operating functional system $31_2$.

Then, the connection switching unit 62 sends a request to start connection to the functional system $31_2$ (step S26). In response, the functional system $31_2$ authenticates the image processing apparatus 200 for remote control connection. If the image processing apparatus 200 is successfully authenticated, the functional system $31_2$ sets the network parameter of the image processing apparatus 200 in a communication setting (i.e., sets the image processing apparatus 200 as a communication partner that sends and receives execution requests and control commands) (step S27).

Meanwhile, if it is not necessary to switch the functional systems 31 (NO in step S24), the connection switching unit 62 terminates the process.

Figure 11:
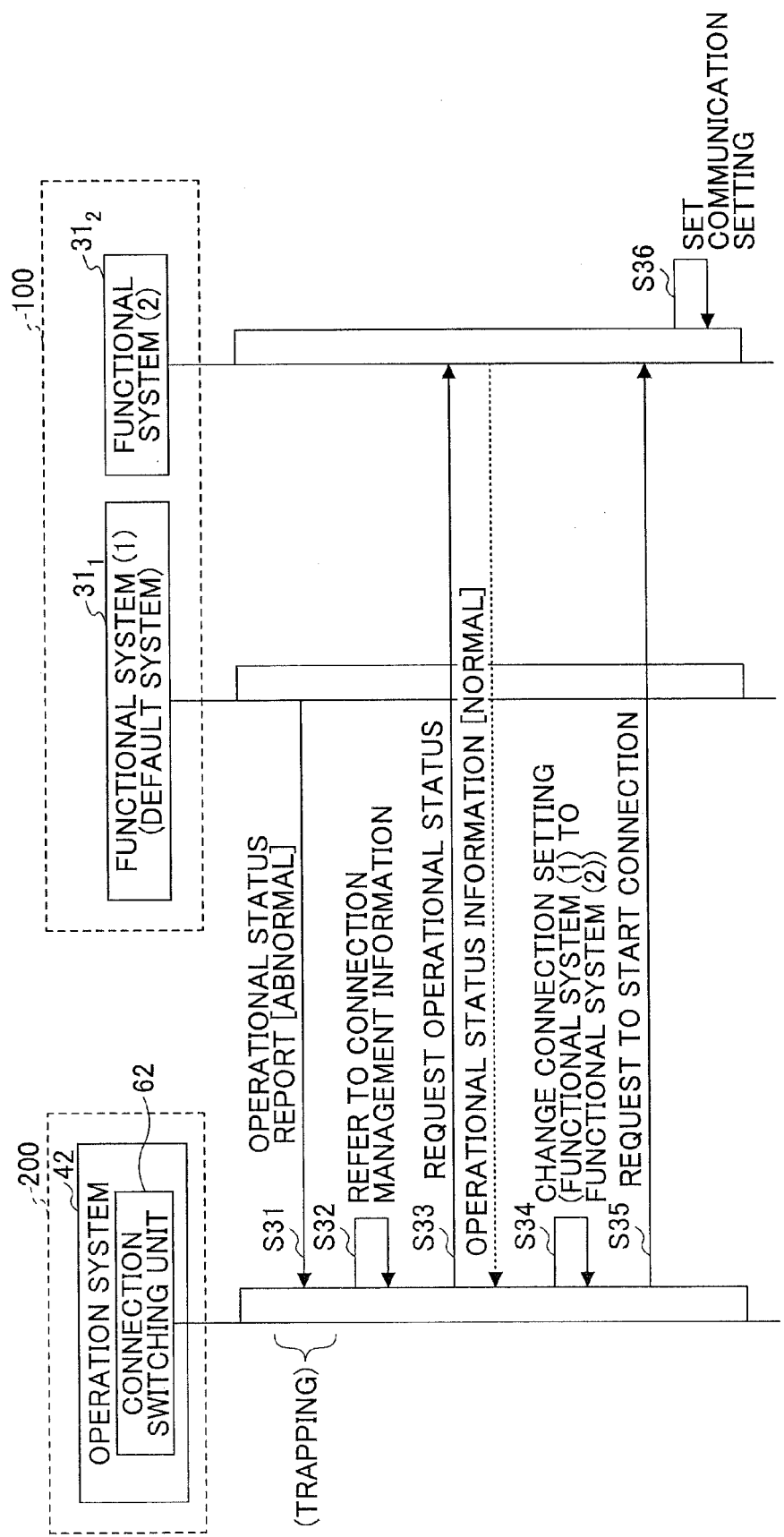
FIG. 11 is a sequence chart illustrating another exemplary process of switching functional systems according to the second embodiment.

FIG. 11 is a sequence chart illustrating another exemplary process of switching the functional systems 31 according to the second embodiment. The process of FIG. 11 is different from the process of FIG. 10 in the method of obtaining operational status information from the functional systems 31 of the information processing apparatus 100. Only the different part of the process is described below.

In the process of FIG. 11, one of the functional systems 31 (in this example, the functional system $31_1$) currently connected with the image processing apparatus 200 "voluntarily" detects a change in its operational status and "actively" reports the change in the operational status to the operation system 42 of the image processing apparatus 200 (step S31). In other words, the functional system $31_1$ "traps" a change in its own operational status and sends operational status information indicating the change in the operational status to the operation system 42 of the image processing apparatus 200.

When receiving the operational status information from the functional system $31_1$, the operation system 42 refers to the connection management information (step S32). Based on the network parameters in the connection management information, the operation system 42 requests another one of the functional systems 31 (in this example, the functional system $31_2$) to send operational status information (step S33). In response, the functional system $31_2$ sends the operational status information to the operation system 42.

Then, the operation system 42 changes the connection setting (step S34) and thereby switches the connection from the functional system $31_1$ to the functional system $31_2$ that is operating normally.

Compared with the process of FIG. 10, the process of FIG. 11 eliminates the need to regularly perform data communications (to confirm the operational status) between the information processing apparatus 100 and the image processing 200 and thereby makes it possible to reduce the communication load.

In short, in the image processing system 1 of the second embodiment, the connection switching unit 62 of the operation system 42 of the image processing apparatus 200 switches the functional systems 31 of the information processing apparatus 100 according to the operational status of the functional systems 31 (form a failed or abnormal functional system 31 to a normally-operating functional system 31).

Image processing performed after the functional systems 31 are switched is substantially the same as that described in the first embodiment. That is, also in the image processing system 1 of this embodiment, the image processing apparatus 200 sends an execution request to execute an image processing function to the information processing apparatus 100; the information processing apparatus 100 executes software programs for implementing the requested image processing function based on the execution request and sends control commands for hardware components used for the image processing function to the image processing apparatus 200, and the image processing apparatus 200 drives the hardware components based on the control commands.

With the above configuration, the image processing system 1 of the second embodiment provides advantageous effects similar to those of the first embodiment. Also, even if one of the functional systems 31 (that is currently connected with the image processing apparatus 200) fails, the image processing system 1 of the second embodiment can continuously provide image processing functions using another one of the functional systems 31 that is operating normally.

The image processing functions of the above embodiments may be implemented by executing programs by processing units (e.g., CPUs) of apparatuses (i.e., the information processing apparatus 100 and the image processing apparatus 200) constituting the image processing system 1. The programs may be written in a programming language(s) supported by the operating environments (platforms) of the apparatuses.

In the case of the information processing apparatus 100, the programs may be stored in a computer-readable storage medium (e.g., the storage medium 103a) and installed into the information processing apparatus 100 via the drive unit 103. Alternatively, the programs may be installed via a telecommunication line and the interface unit 107 into the information processing apparatus 100.

In the second embodiment, the operation system of the image processing apparatus 200 switches the functional systems 31 of the information processing apparatus 100 according to their operational status. When there are two or more normally-operating functional systems 31, the operational system 42 may select one of the functional systems 31 to be connected in predetermined order of priority.

Also, when multiple image processing apparatuses 200 are provided in the image processing system 1 and multiple functional systems 31 are provided in the information processing apparatus 100, the image processing apparatuses 200 may be divided into groups and assigned to the respective functional systems 31 for distributed processing.

As described above, an aspect of this disclosure provides an image processing system, an image processing apparatus, and an information processing apparatus that make it possible to perform image processing through collaboration between apparatuses having communication units.

The present invention is not limited to the specifically disclosed embodiments, and variations and modifications may be made without departing from the scope of the present invention.

What is claimed is:
1. An image processing system, comprising:
an image processing apparatus; and
an information processing apparatus connected via a data communication channel with the image processing apparatus;
wherein the image processing apparatus includes
an execution request unit configured to send an execution request to request the information processing apparatus to execute a requested image processing function,
a command reception unit configured to receive a control command from the information processing apparatus, and
a hardware control unit configured to control a hardware component of the image processing apparatus based on the received control command to perform requested image processing corresponding to the requested image processing function;
wherein the information processing apparatus includes
a request reception unit configured to receive the execution request from the image processing apparatus,
a software control unit configured to execute a software program for implementing the requested image processing function based on the received execution request, and
a command transmission unit configured to send the control command generated by the executed software program to the image processing apparatus;
wherein the information processing apparatus further includes plural first systems each including the request reception unit, the software control unit, and the command transmission unit; and wherein the image processing apparatus further includes a switching unit configured to switch the first systems based on operational status of the first systems.

2. The image processing system as claimed in claim 1, wherein
the information processing apparatus includes plural software programs for implementing image processing functions; and
the software control unit is configured to select the software program for the requested image processing function from the software programs based on the execution request and to execute the selected software program.

3. The image processing system as claimed in claim 2, wherein the software control unit is configured to execute the selected software program according to an execution condition included in the execution request.

4. The image processing system as claimed in claim 1, wherein
the image processing apparatus includes plural hardware components for image processing; and
the hardware control unit is configured to select the hardware component for the requested image processing from the hardware components based on the control command and to control the selected hardware component.

5. The image processing system as claimed in claim 4, wherein the hardware control unit is configured to control the selected hardware component according to operation condition information included in the control command.

6. The image processing system as claimed in claim 5, wherein when two or more of the hardware components are used for the requested image processing, the hardware control unit is configured to determine order and timing of driving the two or more of the hardware components based on operation requirement information in the operation condition information and to control the two or more of the hardware components based on the determined order and timing.

7. The image processing system as claimed in claim 1, wherein the command transmission unit is configured to convert the control command into a data format for transmission according to a communication protocol used between the image processing apparatus and the information processing apparatus and to send the converted control command to the image processing apparatus.

8. The image processing system as claimed in claim 1, wherein if the operational status of one of the first systems currently connected with the image processing apparatus is abnormal, the switching unit is configured to switch from the one of the first systems to another one of the first systems whose operational status is normal.

9. An image processing apparatus connected via a data communication channel with an information processing apparatus that executes a software program for implementing an image processing function based on an execution request and sends a control command generated by the software program to the image processing apparatus, the image processing apparatus comprising:

an execution request unit configured to send the execution request to request the information processing apparatus having plural first systems each including a request reception unit, a software control unit and a command transmission unit, to execute the image processing function;

a command reception unit configured to receive the control command from the information processing apparatus having the plural first systems;

a hardware control unit configured to control a hardware component of the image processing apparatus based on the received control command to perform image processing corresponding to the image processing function; and a switching unit configured to switch the first systems based on operational status of the first systems.

10. An information processing apparatus connected via a data communication channel with an image processing apparatus that controls a hardware component based on a control command to perform image processing, the information processing apparatus comprising:

a request reception unit configured to receive an execution request requesting to execute an image processing function from the image processing apparatus;

a software control unit configured to execute a software program for implementing the image processing function based on the received execution request;

a command transmission unit configured to send the control command generated by the executed software program to the image processing apparatus; and plural first systems each including the request reception unit, the software control unit, and the command transmission unit.

* * * * *